(12) United States Patent
Butz

(10) Patent No.: US 11,648,097 B2
(45) Date of Patent: May 16, 2023

(54) INTERDENTAL CLEANER

(71) Applicant: SUNSTAR SUISSE S.A., Etoy (CH)

(72) Inventor: Jürgen Butz, Schönau (DE)

(73) Assignee: SUNSTAR SUISSE S.A., Etoy (CH)

( * ) Notice: Subject to any disclaimer, the term of this patent is extended or adjusted under 35 U.S.C. 154(b) by 1083 days.

(21) Appl. No.: 15/867,654

(22) Filed: Jan. 10, 2018

(65) Prior Publication Data

US 2018/0193119 A1    Jul. 12, 2018

Related U.S. Application Data

(63) Continuation-in-part of application No. 35/503,129, filed on Jan. 10, 2017 (U.S. filing date under 35 U.S.C. 384), and having an international filing date of Jan. 10, 2017, now Pat. No. Des. 835,417.

(30) Foreign Application Priority Data

Jul. 14, 2016  (DE) ...................... 40 2016 000 962.9
Sep. 24, 2016  (DE) ...................... 40 2016 001 317.0
Jan. 10, 2017  (WO) ................................ DM/096192

(51) Int. Cl.
*A61C 15/02* (2006.01)
*A46B 1/00* (2006.01)
*A46B 5/00* (2006.01)

(52) U.S. Cl.
CPC ............... *A61C 15/02* (2013.01); *A46B 1/00* (2013.01); *A46B 5/0037* (2013.01); *A46B 2200/108* (2013.01)

(58) Field of Classification Search
CPC ....... A61C 15/02; A61C 15/00; A61C 15/046; A46B 15/0069; A46B 2200/108
USPC ......................................... 132/321, 329, 200
See application file for complete search history.

(56) References Cited

U.S. PATENT DOCUMENTS

| | | | | |
|---|---|---|---|---|
| 5,630,244 | A | * | 5/1997 | Chang ................. A46B 5/0062 15/143.1 |
| 5,903,949 | A | * | 5/1999 | Halm .................. A46B 5/0062 15/143.1 |
| 6,158,444 | A | * | 12/2000 | Weihrauch ............. A61C 15/02 132/200 |
| 6,418,940 | B1 | * | 7/2002 | Tcherny ................. A61C 15/00 433/80 |
| D787,128 | S | | 5/2017 | Butz |
| D802,137 | S | | 11/2017 | Butz |
| 9,968,426 | B2 | | 5/2018 | Butz et al. |
| D871,775 | S | | 1/2020 | Butz |
| 10,843,390 | B2 | | 11/2020 | Butz |

(Continued)

FOREIGN PATENT DOCUMENTS

| | | | |
|---|---|---|---|
| JP | 2013188299 A | * | 9/2013 |
| WO | WO-2013105549 A1 | * | 7/2013 ........... A46B 5/0079 |

OTHER PUBLICATIONS

Schreiber Translation of WO2013/105549, translated Jul. 2021, Publication date of WO2013/105549: 2013 (Year: 2013).*

*Primary Examiner* — Jacqueline T Johanas
*Assistant Examiner* — Sarah Woodhouse
(74) *Attorney, Agent, or Firm* — Michael Best & Friedrich LLP

(57) ABSTRACT

An interdental cleaner for cleaning interdental spaces includes a cleaning portion for interdental cleaning and a handle portion connected as a grip to the cleaning portion by a flexible neck portion.

13 Claims, 8 Drawing Sheets

(56) References Cited

U.S. PATENT DOCUMENTS

| | | | |
|---|---|---|---|
| 2007/0163064 A1* | 7/2007 | Wong | A46B 5/026 |
| | | | 15/143.1 |
| 2015/0282601 A1 | 10/2015 | Butz et al. | |
| 2015/0335141 A1* | 11/2015 | Schar | B29C 45/1676 |
| | | | 15/106 |
| 2016/0367345 A1* | 12/2016 | Wallstrom | A61C 15/02 |
| 2017/0216002 A1 | 8/2017 | Butz | |
| 2017/0319310 A1* | 11/2017 | Gengyo | B29C 45/14336 |
| 2018/0193119 A1 | 7/2018 | Butz | |
| 2018/0290358 A1 | 10/2018 | Butz et al. | |
| 2019/0125506 A1 | 5/2019 | Butz | |
| 2021/0000577 A1 | 1/2021 | Butz | |
| 2021/0120944 A1 | 4/2021 | Butz et al. | |
| 2021/0386531 A1 | 12/2021 | Butz | |

* cited by examiner

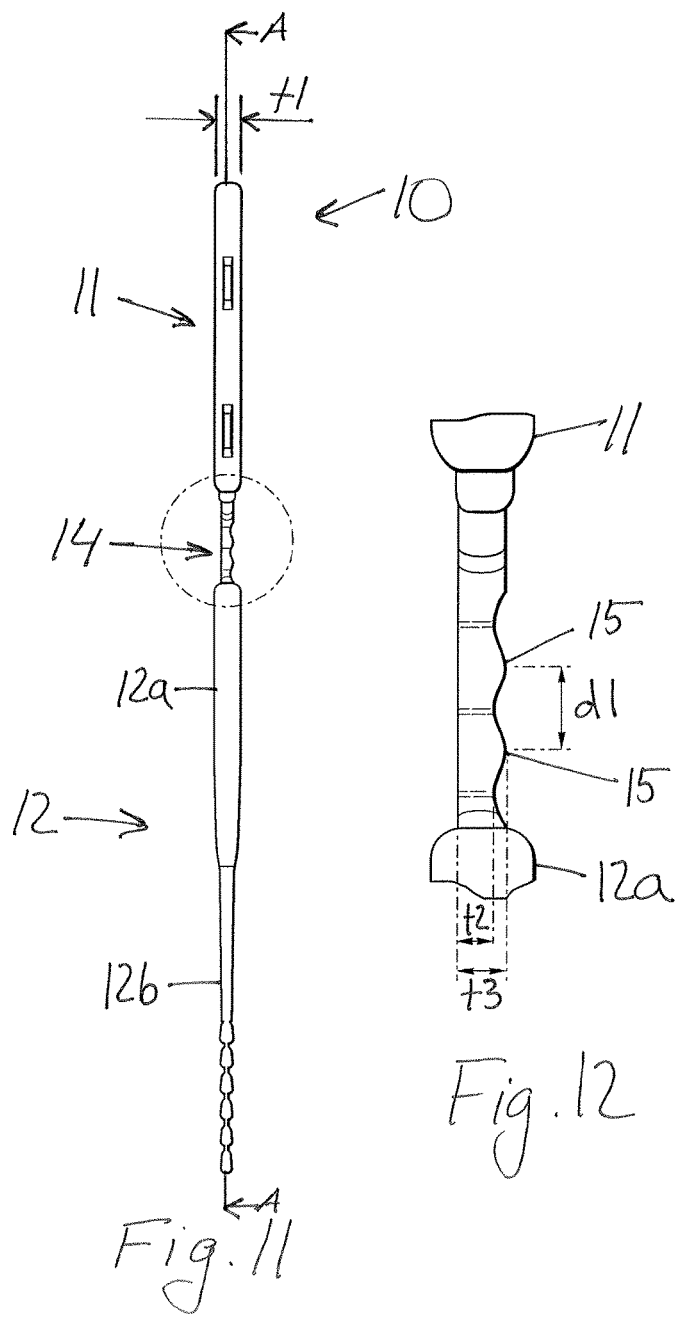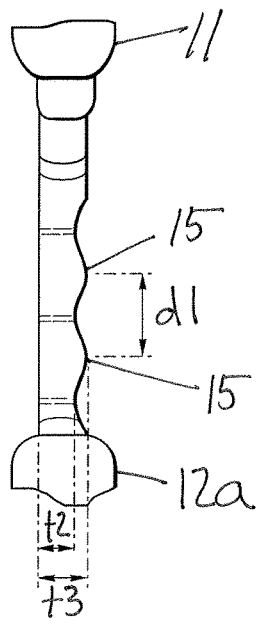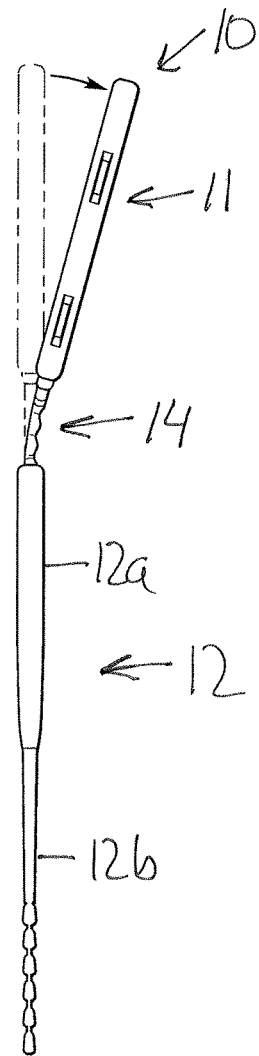
Fig. 11
Fig. 12
Fig. 13

INTERDENTAL CLEANER

RELATED APPLICATIONS

This application is a continuation-in-part of and claims the benefit of priority to U.S. application Ser. No. 35/503,129, which is a national filling of International Design Registration DM/096192, filed Jan. 10, 2017, which claims the benefit of priority to DE 40 2016 001 317.0, filed Sep. 24, 2016, and DE 40 2016 000 962.9, filed Jul. 14, 2016, the entire contents of each of which are incorporated herein by reference.

BACKGROUND

The present disclosure relates to an interdental cleaner for cleaning interdental spaces.

Interdental cleaners generally known in the art may include a synthetic resin core portion, a cleaning soft portion that is made of an elastomer and molded to cover a front end portion of the core portion, and a gripping portion provided at the rear end of the core portion, in which the core portion and the cleaning soft portion form a cleaning portion to be inserted between teeth. When such an interdental cleaner is used to clean spaces between molar teeth, it is typically inserted obliquely into the spaces between the molar teeth because the cheek obstructs its insertion from the cheek side. In order to reduce the possibility of breakage in the process of insertion between molar teeth, some interdental cleaners include a region between the front end of the core portion and the front end of the soft portion that has no core portion and is flexibly bendable, as described in U.S. Pub. No. 2017/0319309, entitled "Interdental Cleaning Device" and filed on May 8, 2017, which is hereby incorporated by reference in its entirety.

SUMMARY

In one embodiment, the present disclosure relates to an interdental cleaner for cleaning interdental spaces having a cleaning portion for interdental cleaning and a handle portion connected as a grip to the cleaning portion by a flexible neck portion.

Other features and advantages of the present disclosure will become apparent by consideration of the following description and the appended claims when taken in connection with the accompanying drawings.

BRIEF DESCRIPTION OF THE DRAWINGS

FIG. 11 illustrates a right side view of the base member of FIG. 8.

FIG. 12 illustrates an enlarged view illustrating the joint portion of the base member of FIG. 11.

FIG. 13 illustrates the base member of FIG. 11 in a bent position.

DETAILED DESCRIPTION

Figure 1:
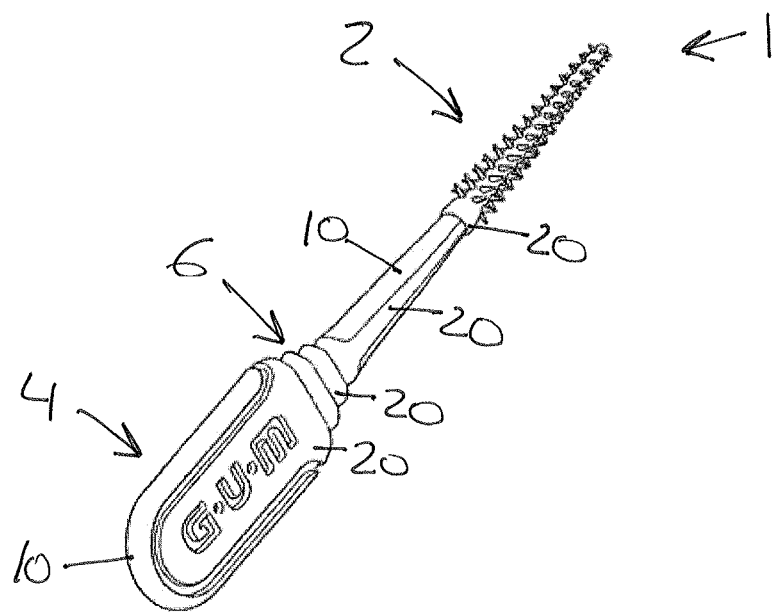
FIG. 1 illustrates a perspective view of an interdental cleaner in accordance with an embodiment of the present disclosure.

Before any embodiments are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. It should be understood that the description of specific embodiments is not intended to limit the disclosure from covering all modifications, equivalents and alternatives falling within the spirit and scope of the disclosure as defined in the appended claims. Also, it is to be understood that the phraseology and terminology used herein is for the purpose of description and should not be regarded as limiting.

Referring now to the figures, FIGS. 1-7 illustrate an embodiment of an interdental cleaner 1 having a cleaning portion 2 for interdental cleaning and a handle portion 4 connected as a grip to the cleaning portion 2 by a flexible neck portion 6. The flexible neck portion 6 allows the cleaning portion 2 to rotate relative to the handle portion 4 about an axis that is perpendicular to the longitudinal axis A of the interdental cleaner 1, as described in more detail below. More specifically, the interdental cleaner 1 includes a base member 10 that is made of a first plastic material and an outer layer 20 that is made of a second plastic material softer than the first plastic material and covers the outer surface of at least a part of the base member 10.

Figure 8:
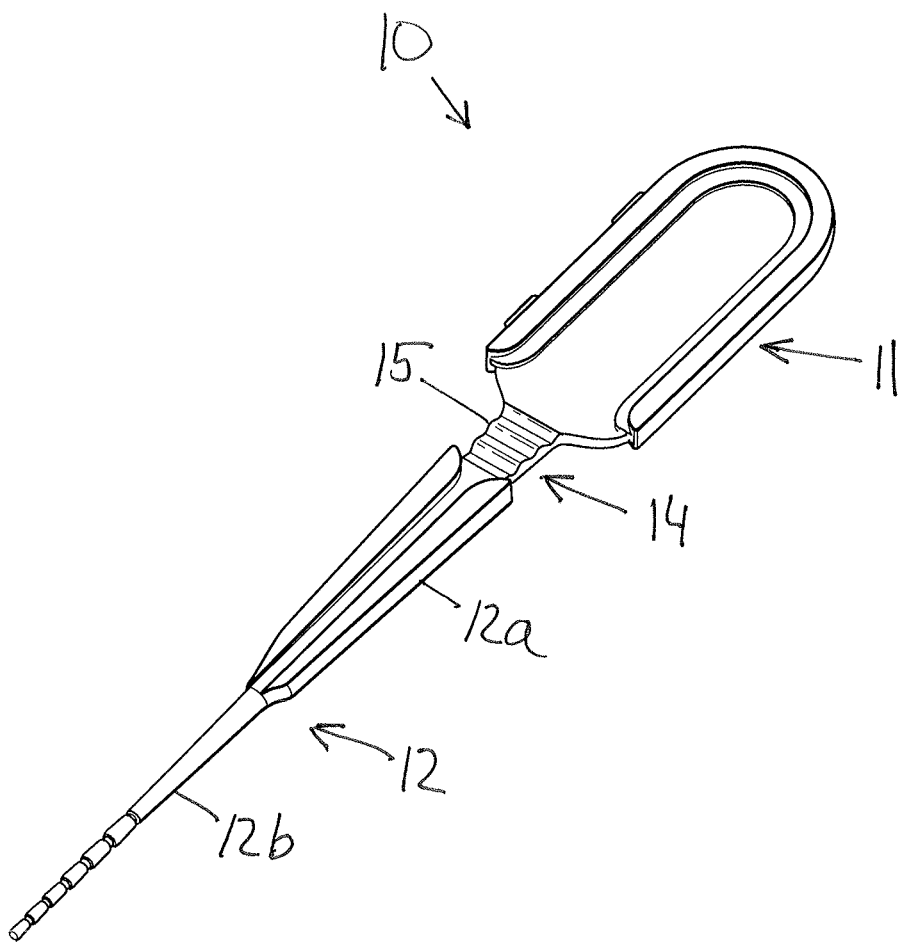
FIG. 8 illustrates a perspective view of a base member of an interdental cleaner in accordance with an embodiment of the present disclosure.
Figure 9:
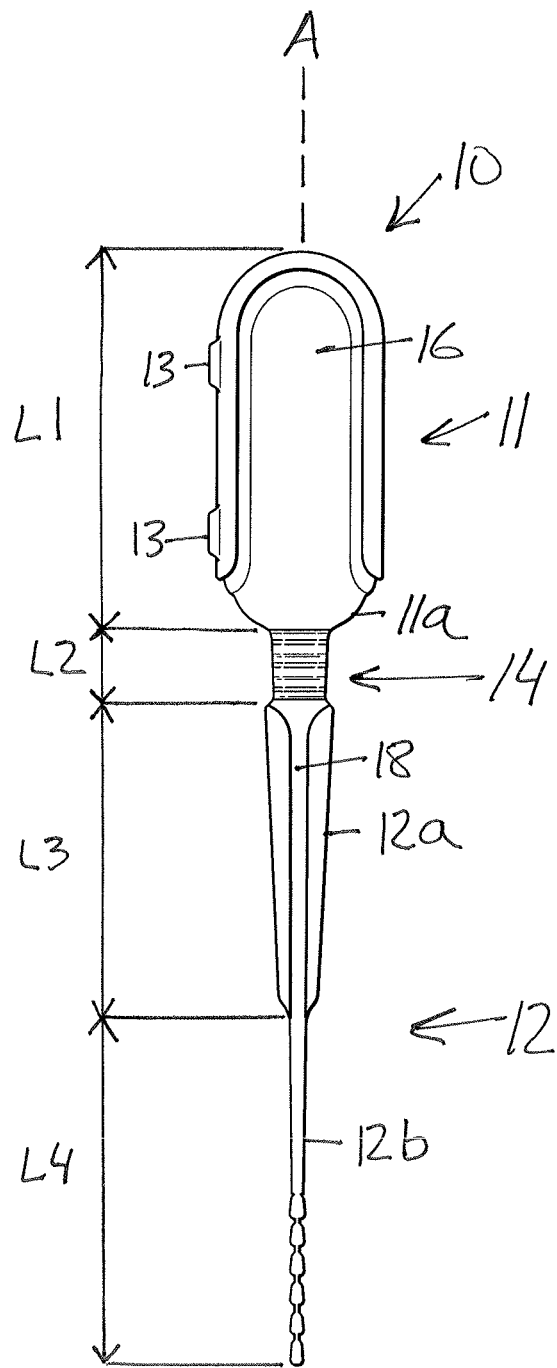
FIG. 9 illustrates a top view of the base member of FIG. 8.
Figure 10:
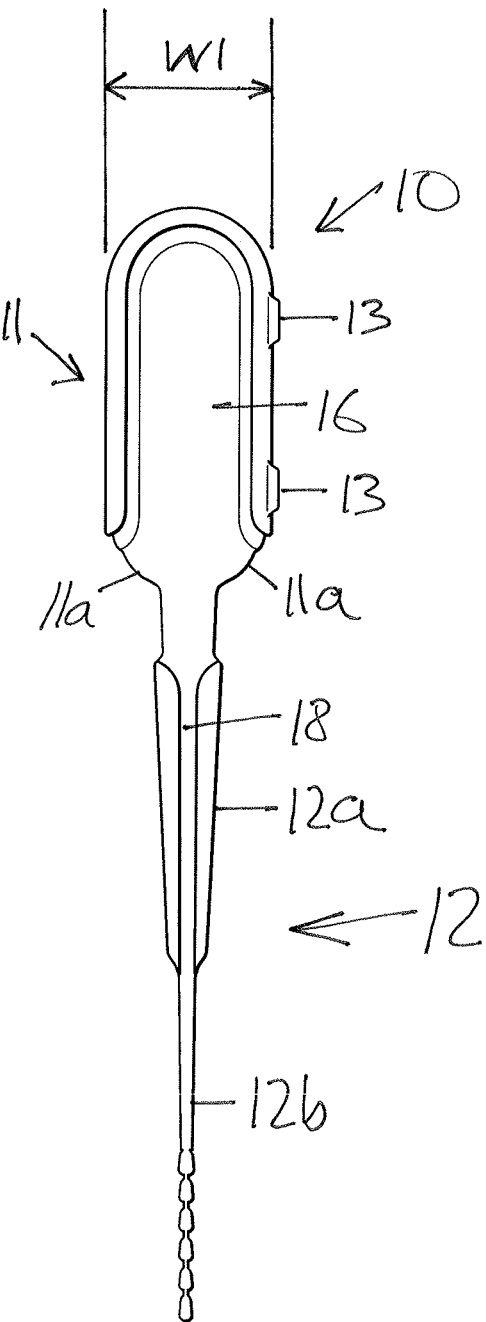
FIG. 10 illustrates a bottom view of the base member of FIG. 8.

With reference to FIGS. 8-10, the base member 10 includes a base handle 11, a stem 12, and a joint 14 that flexibly connects the front end of the base handle 11 and the rear end of the stem 12. The base member 10 may be a single piece, for example, an injection molded or other unitary, one-piece, integral construction.

The base handle 11 of the base member 10 may have a flat slender plate shape and forms a core of the handle 4 of the interdental cleaner 1. Alternatively, the base handle 11 may be formed in any shape other than the flat slender plate shape, such as a rod shape with a circular, elliptical, polygonal, or other cross-sectional shape, as long as its shape facilitates gripping by hand and interdental cleaning. The front end portion 11a of the base handle 11 may become narrower in width toward the stem 12 side, and may be smoothly connected to the joint 14. The base handle 11 may have any dimensions capable of facilitating the gripping by hand and the interdental cleaning. For example, in some embodiments, the base handle 11 has a length L1 of 10 mm to 25 mm, a width W1 of 3.0 mm to 10 mm, and an edge portion thickness t1 of 0.8 mm to 5.0 mm.

Referring back to FIGS. 2 and 3, the top and bottom surfaces of the base handle 11 may be at least partially covered by the outer layer 20 so as to form the handle portion 4 and provide improved grip and a desired visual appearance. In the illustrated embodiment, for example, the top and bottom surfaces of the base handle 11 define recesses 16 that receive the outer layer 20 to form gripping portions having approximately the same thickness t1 as the edge portion of the base handle 11.

Referring to FIGS. 8-13, the joint 14 of the base member 10 may be configured to bend about an axis (the bend axis) perpendicular to the longitudinal axis A of the interdental cleaner 1 and is substantially flexible relative to the base handle 11 and the stem body 12a (discussed below). In the illustrated embodiment, the joint 14 includes a relatively thin ribbed section that is generally rectangular shaped. The joint 14 also has a generally rectangular cross section about the longitudinal axis A of the interdental cleaner 1 that is thinner than the cross section of the base handle 11 and the stem body 12a. A series of ribs or undulations 15 are formed on the top (upper) surface of the joint 14 which may provide improved strength and flexibility. The joint 14 may have a length L2 from 2.5 mm to 5.5 mm, more preferably about 3.85 mm, and a width W2 from 1 mm to 4 mm, more preferably about 2.75 mm. In the illustrated embodiment, the joint 14 may have a thickness t2 of about 0.55 mm in areas without the ribs 15 and a thickness t3 of about 0.7 mm in areas that include the ribs 15. The ribs 15 may be spaced apart in the direction of the longitudinal axis A of the interdental cleaner 1 by a distance d1 of about 1.4 mm.

Figure 2:
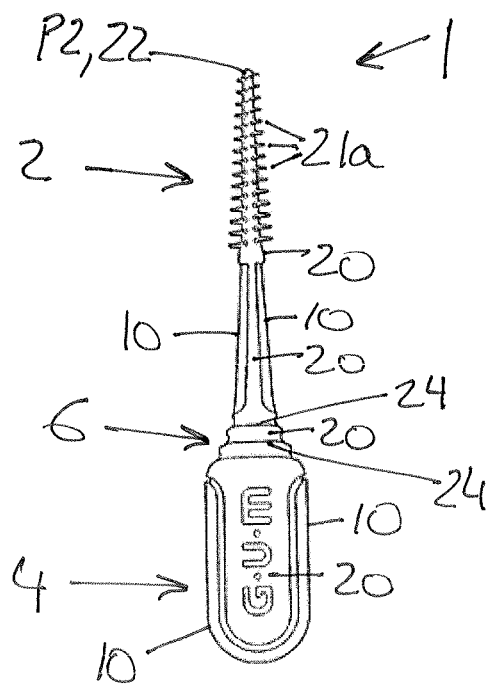
FIG. 2 illustrates a top view of the interdental cleaner of FIG. 1.
Figure 3:
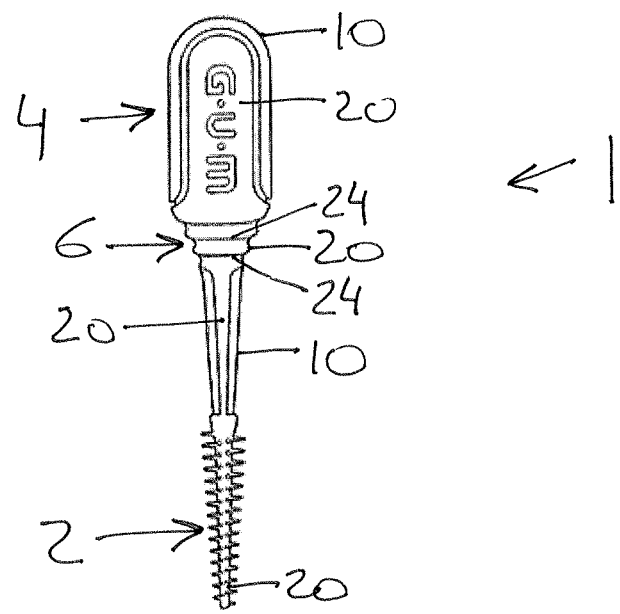
FIG. 3 illustrates a bottom view of the interdental cleaner of FIG. 1.
Figure 4:
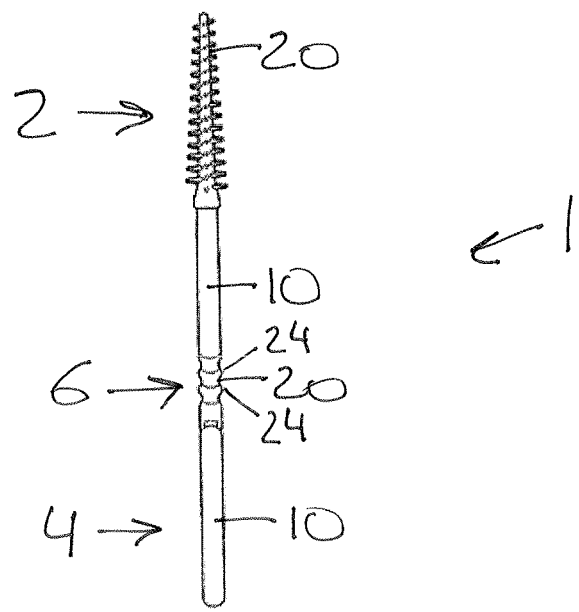
FIG. 4 illustrates a right side view of the interdental cleaner of FIG. 1.
Figure 5:
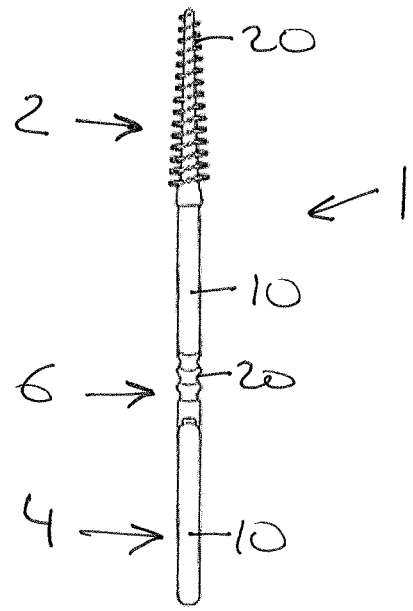
FIG. 5 illustrates a left side view of the interdental cleaner of FIG. 1.
Figure 6:
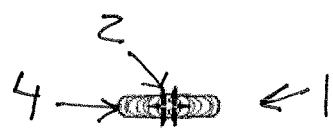
FIG. 6 illustrates a front view of the interdental cleaner of FIG. 1.
Figure 7:
FIG. 7 illustrates a rear view of the interdental cleaner of FIG. 1.
Figure 14:
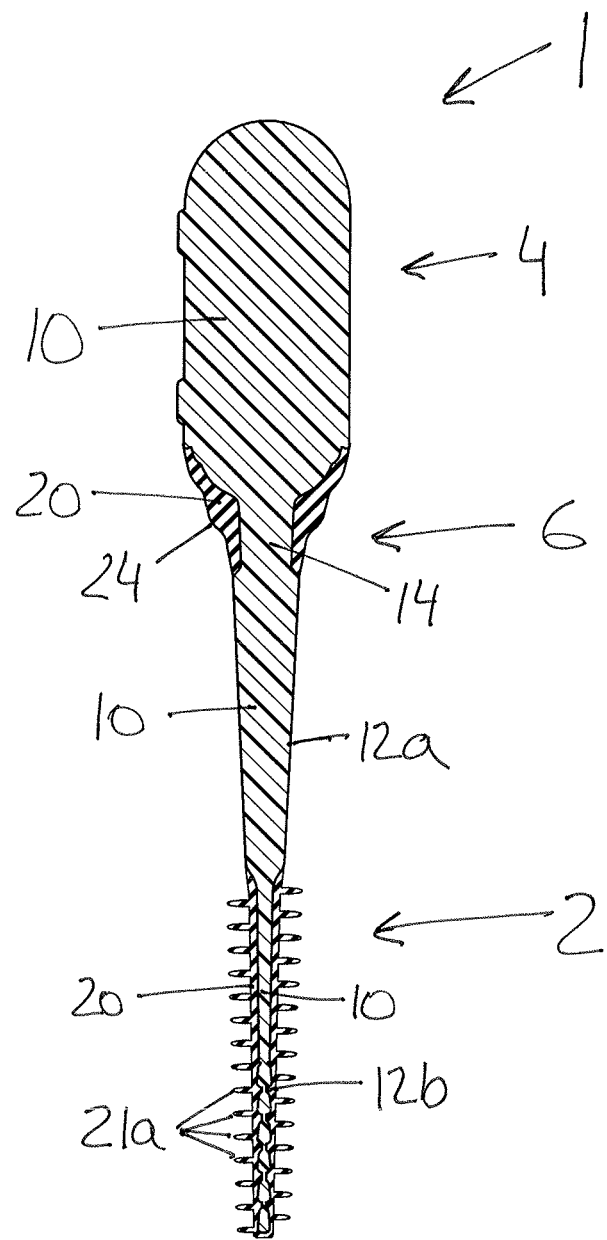
FIG. 14 illustrates a cross-sectional view taken through line A-A of FIG. 11.

Referring to FIGS. 2-3 and 14, the joint 14 of the base member 10 may be covered by the outer layer 20 to provide a desired amount of strength and flexibility at the joint 14. In the illustrated embodiment, for example, the outer layer 20 completely surrounds the joint 14. The outer layer 20 surrounding the joint 14 can taper in the longitudinal direction toward the front end of the joint 14. In particular, the outer layer 20 surrounding the joint 14 may have a width of about 5.5 mm at the rear end of the joint 14 (connected to the front end of the base handle 11) and a width of about 3.3 mm at the front end of the joint 14 (connected to the rear end of the stem 12). The thickness of the outer layer 20 surrounding the joint 14 may be approximately the same as the thickness t1 at the edge portion of the base handle 11. In addition, the outer layer 20 surrounding the joint 14 may include a series of ribs or undulations 24, each of which are disposed or formed above a different rib 15 of the joint 14. In the illustrated embodiment, each of the outer layer ribs 24 extends around the entire perimeter of the joint 14 and completely surrounds the joint 14.

Referring to FIGS. 2-3 and 8-10, the stem 12 of the base member 10 includes a stem body 12a and a bristle core 12b, which, in combination with portions of the outer layer 20 covering the stem 12, form the cleaning portion 2 of the interdental cleaner 1. The stem body 12a may have a flat slender V-shaped configuration that tapers in the longitudinal direction toward the front end of the stem 12 and approximately the same thickness as the gripping portion thickness of the base handle 11. The stem body 12a may also define a channel 18 on each of its outer top and bottom surfaces extending along the entire length of the stem body 12a. Each channel 18 can receive a portion of the outer layer 20, thereby providing a desired stiffness for the stem body 12a without additional weight and/or providing a desired visual appearance.

The bristle core 12b may be formed in a substantially-linear, slender rod shape (shaft shape) and may be gently tapered to decrease in diameter toward the front end of the stem body 12. The outer layer 20 surrounds and covers the entire outer surface of the bristle core 12b. In the illustrated embodiment, the outer layer 20 has a plurality of protrusions or bristles 21a that are formed to protrude to the outside and spaced apart from one another in the longitudinal direction (axial direction) of the cleaning portion 2. The protrusions 21a are formed apart from one another in the longitudinal direction of the outer layer 20 and also arranged apart from one another in the circumferential direction of the outer layer 20.

In view of handleability, a length L3 of the stem body 12a may be from 10 mm to 50 mm, preferably from 10 mm to 25 mm. In view of the ability to clean the space between teeth, a length L4 of the bristle core 12b can be, for example, from 9 mm to 22 mm. In view of insertability into the space between teeth, the tapered surface of the bristle core 12b makes an angle θ of 0.2° to 1.8° with the central line of the stem 12. The front end portion of the bristle core 12b has a diameter of 0.3 mm to 0.6 mm. The base end portion of the bristle core 12b has a diameter of 0.8 mm to 2.0 mm.

The outer layer 20 may have a soft front end P2 at its front end, which corresponds to the front end of the interdental cleaner 1. The curved surface end of the soft front end P2 has a diameter D of 0.5 to 1.2 mm, preferably 0.5 to 1.0 mm, more preferably 0.5 to 0.8 mm. The soft front end P2 of the outer layer 20 may extend a length Lp beyond the bristle core front end (not shown) to form a region of the outer layer 20 between the bristle core front end and the soft front end P2 that does not contain any part of the stem 12. The region of the outer layer 20 extending the length Lp from the soft front end P2 is referred to as a soft guide portion 22. Since the soft guide portion 22 does not contain the stem 12, it is easy to bend and can assist the user to reliably insert the soft front end P2 between teeth.

According to some embodiments, the outer layer 20 has a partial length Lp of 0.5 mm or more (substantially 0.45 mm or more, taking into account significant figures), more preferably 0.7 mm or more, between the bristle core front end and the soft front end P2. The length Lp is also 2.0 mm or less, more preferably 1.5 mm or less. The soft guide portion 22 preferably also may have a thickness (diameter) A of, for example, about 0.7 mm to about 1.0 mm at the position of the core front end, and preferably has a ratio (Lp/A) of the length Lp to the thickness A of about 0.5 to about 2.5, more preferably about 0.7 to about 2.1 (substantially 0.65 to 2.14 taking into account significant figures). The thickness of the outer layer 20 covering the bristle core 12b is preferably from 0.1 mm to 0.3 mm.

In addition, at least one of the protrusions 21a may be formed in the soft guide portion 22. Alternatively, the protrusion 21a may be absent in the soft guide portion 22. Even in such a case, the soft guide portion 22 with a length Lp of 0.5 mm or more can guide the cleaning portion 2 into the interdental space, so that the possibility of breakage of the interdental cleaner 1 can be reduced in the process of inserting the cleaning portion 2 into the space between molar teeth.

The angle θ of the tapered surface of the stem 12 may be constant over the entire length of the stem 12. Alternatively, however, the angle θ may be continuously or gradually reduced toward the front end side of the stem 12. In addition, the stem body 12a may be formed in a shaft shape with a constant diameter over its entire length, and only the bristle core 12b may be gently tapered to decrease in diameter toward the front end side. Alternatively, the stem body 12a may also be omitted, and the bristle core 12b may be connected directly to the base handle 11.

The base member 10 may be made of, for example, a mixture of fibers and synthetic resin having elasticity. Examples of synthetic resin materials that can be used to form the base member 10 include polypropylene (PP), polybutylene terephthalate (PBT), polyethylene, polyethylene terephthalate, polycyclohexylene dimethylene terephthalate, saturated polyester resins, polymethyl methacrylate, cellulose propionate, polyurethane, polyamide, polycarbonate, ABS (acrylonitrile-butadiene-styrene) resins, and other thermoplastic synthetic resin materials. In particular, polypropylene (PP) and polybutylene terephthalate (PBT) are preferred, which can prevent the base member 10 from buckling. Polypropylene is most preferred, which can be molded at low temperatures, can reduce cycle time and improve productivity, and can be processed with a lower thermal load on the molding facility.

The fibers added to the synthetic resin material for forming the base member 10 may be, for example, glass fibers, carbon fibers, or aramid fibers. The content of the fibers depends on the synthetic resin material for forming the base member 10. Basically, the base member 10 with a fiber content of less than 12% by weight can easily bend so that the cleaning portion 2 can be difficult to insert between teeth, and the base member 10 with a fiber content of more than 35% by weight can make the cleaning portion 2 buckle easily. Therefore, the content of the fibers in the base member 10 is preferably 12% by weight or more and 35% by weight or less, more preferably 15% by weight or more and 35% by weight or less, even more preferably 20% by weight or more and 30% by weight or less. Specifically, when polypropylene (PP) is used as the synthetic resin material, the fiber content is preferably 15% by weight or more and 35% by weight or less, and when polybutylene terephthalate (PBT) is used as the synthetic resin material, the fiber content is preferably 12% by weight or more and 35% by weight or less.

The longitudinal direction of the fibers is preferably oriented in a direction along the longitudinal direction of the base member 10. This feature makes it possible to improve the bending strength or axial buckling strength of the base member 10 and to effectively prevent the stem 12 from bending or buckling during use of the interdental cleaner 1. When the fibers are oriented in the longitudinal direction of the base member 10, the connecting portions 13 (described below) also have the fibers oriented along the longitudinal direction of the base member 10, so that the interdental cleaners 1 molded in parallel can be cleanly cut off from each other at the connecting portions 13 by turning the interdental cleaner 1 about the connecting portions 13 in such a manner that the adjacent interdental cleaners 1 are placed over each other. The addition of the fibers also improves the dimensional stability of the stem 12 and increases the strength and stiffness of the stem 12 so that undesirable deformation is prevented. The fibers can also raise the thermal deformation temperature of the stem 12, which makes it possible to effectively prevent the stem 12 from being softened and deformed by heat from the elastomeric material during the molding of the outer layer 20. The fibers can also increase the strength and stiffness, which makes it possible to prevent the stem 12 from being deformed by the elastomeric material injection pressure and to effectively prevent poor molding of the outer layer 20.

The outer layer 20 may be made of an elastic material softer than the base member 10. For example, the outer layer 20 includes an elastic material, such as an elastomer, having a Shore hardness of A30 to A50. Examples of the elastomer that can be used to form the outer layer 20 include thermoplastic elastomers such as styrene elastomers, olefin elastomers, and polyamide elastomers; and thermosetting elastomers such as silicone rubbers, urethane rubbers, fluororubbers, natural rubbers, and synthetic rubbers. Particularly in view of safety of the material for use in oral cavity, the outer layer 20 preferably includes a polyolefin or styrene thermoplastic elastomer or a silicone rubber. Also in view of compatibility with the synthetic resin material used to form the base member 10, the outer layer 20 more preferably includes a polyolefin or styrene thermoplastic elastomer, for example, when the base member 10 includes polypropylene as described below.

FIG. 13 is an explanatory view for illustrating the bending at the flexible neck portion 6, thereby allowing the cleaning portion 2 to rotate relative to the handle portion 4. When the user grips the interdental cleaner 1 and inserts it between the molar teeth, the flexible neck portion 6 can easily bend so that a front end of the cleaning portion 2 faces the molar teeth. As a result, the interdental cleaner can be directed to the space between the teeth and maneuvered more easily in the process of inserting the interdental cleaner 1 between the molar teeth, and thus the possibility of breakage of the interdental cleaner 1 can be reduced.

Figure 15:
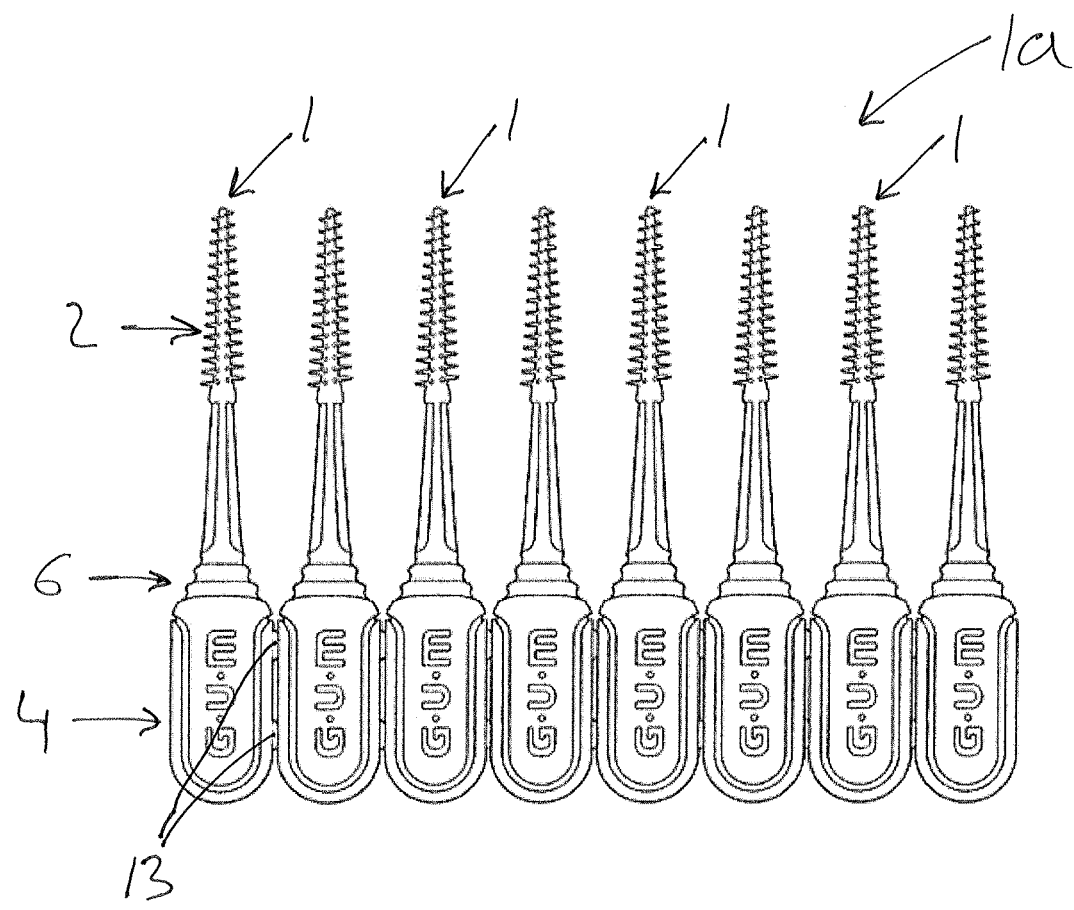
FIG. 15 illustrates a front view of a chain having a plurality of interdental cleaners in accordance with an embodiment of the present disclosure connected to one another.

As illustrated in FIG. 15, a plurality of interdental cleaners 1 can be separably connected in parallel to form an interdental cleaner chain 1A. In particular, the base member 10 of each interdental cleaner 1 may comprise one or more connecting portions 13 separably connecting adjacent handle portions 11. A user can use each interdental cleaner 1 by disconnecting one by one the interdental cleaners 1 at the connecting portions 13 from one side of the interdental cleaner chain 1A. Although FIG. 1 illustrates that 8 interdental cleaners 1 are connected in parallel to form the interdental cleaner chain 1A, any number of interdental cleaners 1 may be connected to form the interdental cleaner chain 1A. The interdental cleaner chain 1A including the interdental cleaners 1 is also a non-limiting example. Alternatively, the interdental cleaners 1 may be each independently formed.

For the production of the interdental cleaner 1, the second plastic material of the outer layer 20 may be fixed to the first plastic material of the base member 10 using any suitable means. For example, the second plastic material of the outer layer 20 may be injection molded onto and/or welded to the first plastic material of the base member 10 using a two-component injection molding process, as described in U.S. Pat. No. 6,158,444.

Thus, the invention provides, among other things, an interdental cleaner for cleaning interdental spaces including a cleaning portion for interdental cleaning and a handle portion connected as a grip to the cleaning portion by a flexible neck portion. Various features and advantages of the invention are set forth in the following claims.

What is claimed is:

1. An interdental cleaner for cleaning interdental spaces and defining a longitudinal axis, the interdental cleaner comprising:
   a cleaning portion for interdental cleaning;
   a flexible neck portion connected to the cleaning portion; and a handle portion connected to the cleaning portion by the flexible neck portion, the longitudinal axis extending from the handle portion to the cleaning portion, wherein the flexible neck portion is made of a first plastic material having a first ribbed surface and a second planar, non-ribbed surface opposite the first ribbed surface, and a second plastic material that is softer than the first plastic material and includes a second ribbed surface that covers the first ribbed surface and the second planar non-ribbed surface, the first ribbed surface having a plurality of ribs that each extend parallel to a transverse axis that is perpendicular to the longitudinal axis, the second ribbed surface defining one or more ribs that extend outwardly about a perimeter of the flexible neck portion that is transverse to the longitudinal axis; and wherein the cleaning portion and the handle portion are made of the first plastic material to form a unitary, one-piece, integral construction with the flexible neck portion, and wherein the flexible neck portion is configured to allow the cleaning portion to bend relative to the handle portion about the transverse axis.

2. An interdental cleaner for cleaning interdental spaces comprising:
   a base member comprising an integral construction formed entirely from a first plastic material and having a longitudinal axis, the base member including
       a base handle,
       a stem, and
       a joint that connects a front end of the base handle and a rear end of the stem and is flexible relative to the front end of the base handle and the rear end of the stem, the longitudinal axis extending from the base handle to the stem, the joint defining a first interior ribbed surface having a plurality of ribs that each extend parallel to a transverse axis that is perpendicular to the longitudinal axis and a second interior planar non-ribbed surface opposite the first interior ribbed surface, wherein the joint is configured to allow the stem to bend relative to the base handle about the transverse axis; and
   an outer layer made of a second plastic material softer than the first plastic material, the outer layer surrounding the joint on all sides thereof and forming an interior non-ribbed surface and an exterior ribbed surface.

3. The interdental cleaner of claim 2, wherein the base handle has a flat slender plate shape.

4. The interdental cleaner of claim 2, wherein a top surface and a bottom surface of the base handle are at least partially covered by the outer layer.

5. The interdental cleaner of claim 2, wherein the joint has a generally rectangular cross section that is thinner than a cross section of the front end of the base handle and a cross section of the rear end of the stem.

6. The interdental cleaner of claim 2, wherein the outer layer extends along a length of the joint.

7. The interdental cleaner of claim 6, wherein the outer layer tapers along the length of the joint in a direction toward the rear end of the stem.

8. The interdental cleaner of claim 6, wherein the exterior ribbed surface comprises a series of second ribs that extend outwardly from and along the length of the joint.

9. The interdental cleaner of claim 8, wherein each of the second ribs surrounds the joint on all sides thereof.

10. The interdental cleaner of claim 2,
    wherein the stem includes a stem body connected to a bristle core,
    wherein the stem body has a generally flat, V-shaped configuration that tapers in a longitudinal direction away from the rear end of the stem, the stem body defining a channel along a length of the stem body, and
    wherein the outer layer is received in the channel of the stem body and covers an outer surface of the bristle core, the outer layer forming a plurality of bristles along a length of the bristle core.

11. The interdental cleaner of claim 2, wherein the outer layer also covers at least a portion of the base handle and at least a portion of the stem and the outer layer is continuous between the joint and the base handle and between the joint and the stem.

12. The interdental cleaner of claim 2, wherein fibers are present in the base member at a concentration of about 12 wt % to about 35 wt %, the fibers comprise glass fibers, carbon fibers, or aramid fibers.

13. An interdental cleaner for cleaning interdental spaces and defining a longitudinal axis, the interdental cleaner comprising:
    a cleaning portion for interdental cleaning;
    a flexible neck portion connected to the cleaning portion;
    a handle portion connected to the cleaning portion by the flexible neck portion; the longitudinal axis extending from the handle portion to the cleaning portion and
    wherein the flexible neck portion is made of a first plastic material having a first ribbed surface and a second planar, non-ribbed surface opposite the first ribbed surface, and a second plastic material that is softer than the first plastic material and includes a second ribbed surface that covers the first ribbed surface and the second planar non-ribbed surface, the first ribbed surface having a plurality of ribs that each extend parallel to a transverse axis that is perpendicular to the longitudinal axis, the plurality of ribs being spaced apart in a direction of the longitudinal axis, the second ribbed surface defining one or more ribs that extend outwardly about a perimeter of the flexible neck portion that is transverse to the longitudinal axis; and
    wherein the flexible neck portion tapers along the longitudinal axis of the interdental cleaner, and
    wherein the cleaning portion and the handle portion are made of the first plastic material to form a unitary, one-piece, integral construction with the flexible neck portion.

* * * * *